United States Patent [19]

Sandstrom et al.

[11] Patent Number: 5,021,492

[45] Date of Patent: Jun. 4, 1991

[54] RUBBER COMPOSITIONS CONTAINING A MIXTURE OF ALKYL ESTERS OF ROSIN ACID

[75] Inventors: Paul H. Sandstrom; Lawson G. Wideman, both of Tallmadge; Thomas J. Segatta, Fairlawn, all of Ohio

[73] Assignee: The Goodyear Tire & Rubber Company, Akron, Ohio

[21] Appl. No.: 601,101

[22] Filed: Oct. 22, 1990

[51] Int. Cl.$^5$ .............................................. C08L 217/00
[52] U.S. Cl. .................................. 524/274; 524/270; 524/271; 524/272
[58] Field of Search ................ 524/274, 270, 271, 272

[56] References Cited

U.S. PATENT DOCUMENTS

| | | | |
|---|---|---|---|
| 1,923,938 | 8/1933 | Kyrides | 260/103 |
| 1,951,593 | 3/1934 | Bradley | 260/8 |
| 1,979,671 | 11/1934 | Butts | 260/99.40 |
| 2,369,125 | 2/1945 | Anderson | 260/104 |
| 2,736,664 | 2/1956 | Bradley et al. | 106/173 |
| 4,297,270 | 10/1981 | Uhrig et al. | 260/104 |
| 4,324,710 | 4/1982 | Davis et al. | 524/76 |
| 4,373,041 | 2/1983 | Wood et al. | 524/77 |
| 4,419,470 | 12/1983 | Davis et al. | 524/76 |
| 4,478,993 | 10/1984 | Wideman et al. | 527/600 |
| 4,491,655 | 1/1985 | Sandstrom | 527/600 |

*Primary Examiner*—Paul R. Michl
*Assistant Examiner*—Yong S. Lee
*Attorney, Agent, or Firm*—Bruce J. Hendricks

[57] ABSTRACT

The present invention relates to the use of a mixture of alkyl ($C_6$–$C_{18}$) esters of rosin acids which are useful as a total or partial replacement for conventional waxes and diamine antidegradants in rubber formulations. Addition of the mixture of alkyl ($C_6$–$C_{18}$) esters of rosin acid improve the weathering resistance of cured rubber compositions.

10 Claims, No Drawings

RUBBER COMPOSITIONS CONTAINING A MIXTURE OF ALKYL ESTERS OF ROSIN ACID

BACKGROUND OF THE INVENTION

It is known that vulcanized rubber products develop cracks when their surface is under mechanical strain and exposed to the effects of ozone. The service life of such products can be significantly extended by the addition of small quantities of diamine antidegradants. Unfortunately, all of the conventional diamine antidegradants are expensive and tend to discolor adjoining materials on contact therewith. It is also known that certain waxes can be used to improve rubber products' resistance to ozone. Although such waxes do exert a certain protective effect, they will only produce this effect providing the film of protective wax formed over the surface of the product remains fully intact. Unfortunately, the film is removed during use of the product with the net result that the ozone-induced cracks developed at the areas of exposure. Even when the wax film remains fully intact, protection is far from complete because a small quantity of ozone still penetrates through the film and ultimately leads to the development of cracks. Therefore, there exists a need to decrease the use of diamine antidegradants and waxes without decreasing the resistance of the rubber to ozone and oxygen.

SUMMARY OF THE INVENTION

The present invention relates to rubber compositions containing a mixture of alkyl esters of rosin acid. Use of the mixture of alkyl esters of rosin acid in a rubber vulcanizate improves the ozone resistance of the vulcanizate.

DETAILED DESCRIPTION OF THE INVENTION

There is disclosed a process for preparing rubber compositions which comprises admixing a rubber selected from the group consisting of natural rubber, homopolymers of conjugated diolefins, copolymers of conjugated diolefins and ethylenically unsaturated monomers or mixtures thereof with a mixture of alkyl esters of rosin acid wherein said mixture of alkyl esters of rosin acid comprise at least (a) from about 10 to about 50 percent by weight of a $C_6$ ester of rosin acid;
(b) from about 10 to about 50 percent by weight of a $C_{12}$ ester of rosin acid; and
(c) from about 10 to about 50 percent by weight of $C_{18}$ ester of rosin acid.

There is also disclosed a rubber composition which comprises (1) a rubber selected from the group consisting of natural rubber, homopolymers of conjugated diolefins, copolymers of conjugated diolefins and ethylenically unsaturated monomers or mixtures thereof and a mixture of alkyl esters of rosin acid wherein said mixture of alkyl esters of rosin acid comprise at least (a) from about 10 to about 50 percent by weight of a $C_6$ ester of rosin acid;
(b) from about 10 to about 50 percent by weight of a $C_{12}$ ester of rosin acid; and
(c) from about 10 to about 50 percent by weight of a $C_{18}$ ester of rosin acid.

Rosin is a solid resinous material that occurs naturally in pine trees. The three major sources of rosin are gum rosin, wood rosin and tall oil rosin. Gum rosin is from the oleoresin extrudate of the living pine tree. Wood rosin is from the oleoresin contained in the aged stumps. Tall oil rosin is from the waste liquor recovered as a by-product in the Kraft paper industry.

The aged virgin pine stump is the source of wood rosin. The stump is allowed to remain in the ground for about ten years so that its bark and sapwood may decay and slough off to leave the heartwood rich in resin. It is known that production of pine stump rosin can be artificially stimulated by injecting the herbicide, Paraquat, into the lower portion of the tree. This treatment of the stump produces Pinex TM rosin.

Rosins derived from both oleoresin and aged stump wood are composed of approximately 90% resin acids and 10% nonacidic components. Chemical treatment of rosins, such as hydrogenation, dehydrogenation, or polymerization are known which produce modified resins.

Rosin acids are monocarboxylic acids having the typical molecular formula, $C_{20}H_{30}O_2$. Examples of the resin acids are abietic, levopimaric, neoabietic, palustric, dehydroabietic, tetrahydroabietic, pimaric, isopimaric, $\Delta$-isopimaric, elliotinoic and sandaracopimaric. Over the years nomenclature of individual acids has changed. IUPAC nomenclature names resin acids as derivatives of abietane. The two major rosin acid components are abietic acid having the following structural formula:

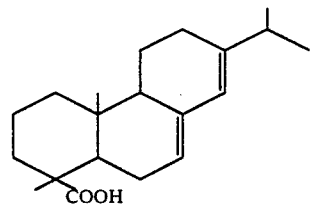

and dehydroabietic acid, having the strucrural formula:

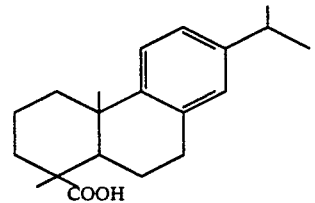

The acid number for the rosin acid may vary. Generally the acid number ranges from about 160 to about 175. Preferably the acid number is below 170 with a range of from about 165 to about 168 being particularly preferred.

The rosin acid or acids are reacted with a mixture of aliphatic alcohols having 6, 12 and 18 carbon atoms under esterification conditions. The mixture of alcohols should contain from about 10 to about 50 weight percent of hexyl alcohol, 10 to about 50 weight percent of dodecyl alcohol and 10 to about 50 weight percent of octadecyl alcohol. So long as the minimal amounts of each of the three alcohols are met, the remaining alcohol mixture may contain other aliphatic alcohols. Representative of such aliphatic alcohols which may be used include tridecyl alcohol, tetradecyl alcohol, pentadecyl alcohol, hexadecyl alcohol, heptadecyl alcohol, nonadecyl alcohol, eicosyl alcohol, heneicosyl alcohol, docosyl alcohol or mixtures thereof. Preferably the mixture of aliphatic alcohols contain from about 30 to about 35 percent by weight of hexyl alcohol, 30 to about 35 percent by weight of dodecyl alcohol, and 30 to about 35 percent by weight of octadecyl alcohol. Therefore, the preferred mixture of alkyl ($C_6$–$C_{18}$) esters of rosin acid contain 30 to 35 percent by weight of $C_6$ ester, 30 to 35 percent by weight of $C_{12}$ ester and 30 to 35 percent by weight of $C_{18}$ ester.

The mole ratio of the rosin acid to aliphatic alcohols in the mixture may vary. Generally, the mole ratio of rosin acid to the aliphatic alcohols will range from about 0.5 to about 1.5. Preferably the mole ratio of rosin acid to aliphatic alcohols is from about 0.6 to about 1.0.

The rosin acid or acids are reacted with the mixture of aliphatic alcohols under esterification conditions to form the mixture of alkyl esters of rosin acid. Representative of the products of the present invention are the $C_6$, $C_{12}$ and $C_{18}$ alkyl esters of the following acids: abietic, dehydroabietic, levopimaric, neoabietic, palustric, tetrahydroabietic, pimaric, isopimaric, $\Delta$-isopimaric, elliotinoic and sandaracopimaric. Representative of the above esters are of the formula:

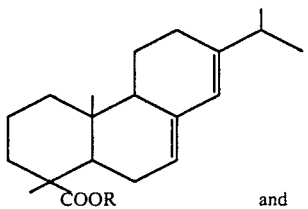 and 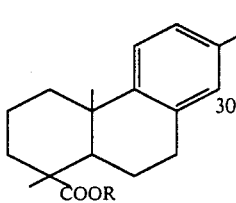

wherein R is an alkyl radical having 6, 12 and 18 carbon atoms.

An organic solvent may be used to dissolve the rosin acid, to increase heat transfer and to facilitate water removal through a reflux trap. The solvent is preferably inert to the esterification reaction.

Illustrative of solvents suitable for use in the practice of this invention include: saturated and aromatic hydrocarbons, e.g., hexane, octane, dodecane, naphtha, decalin, tetrahydronaphthalene, kerosene, mineral oil, cyclohexane, cycloheptane, alkyl cycloalkane, benzene, toluene, xylene, alkyl-naphthalene, and the like; ethers such as tetrahydrofuran, tetrahydropyran, diethylether, 1,2-dimethoxybenzene, 1,2-diethoxybenzene, the mono- and dialkylethers of ethylene glycol, propylene glycol, butylene glycol, diethylene glycol, dipropylene glycol, oxyethyleneoxypropylene glycol, and the like; fluorinated hydrocarbons that are inert under the reaction conditions such as perfluoroethane, monofluorobenzene, and the like. Another class of solvents are sulfones such as dimethylsulfone, diethylsulfone, diphenolsulfone, sulfolane, and the like. Mixtures of the aforementioned solvents may be employed so long as they are compatible with each other under the conditions of the reaction and will adequately dissolve the rosin acid and not interfere with the esterification reaction.

The esterification reaction may be conducted in the presence of a catalyst to speed up the reaction. Examples of catalysts that may be used include condensation catalysts, e.g., dibutyltin oxide or butyl stannoic acid. In addition acid catalysts may be used such as sulfuric acid, hydrochloric acid and toluenesulfonic acid. The amount of catalyst that is used will vary depending on the particular catalyst that is selected. For example, when an acid catalyst is used, from about 5 weight percent to about 10 weight percent is recommended.

The esterification reaction may be conducted over a variety of temperature ranges. The temperatures may range from moderate to an elevated temperature. In general, the esterification reaction may be conducted at a temperature ranging from about 100° C. to about 250° C. In most cases, when operating at the lower end of the temperature range, it is desirable to utilize pressures at the higher end of the range. The preferred temperature range is from about 110° C. to about 200° C., while the most preferred temperature range is from about 120° C. to about 190° C.

The esterification reaction may be conducted over a variety of pressures. Preferably the reaction is conducted at a pressure range of from about 0 to about 100 psig.

The esterification reaction is conducted for a period of time sufficient to produce the desired mixture of alkyl esters of rosin acid. In general, the reaction time can vary from minutes to several hours. If the more sluggish reaction conditions are selected, then the reaction time will have to be extended until the desired product is produced. It is appreciated that the residence time of the reactants will be influenced by the reaction temperature, concentration and choice of catalyst, if any, reaction pressure, concentration and choice of solvent, and other factors.

The esterification of the rosin acid may be carried out in a batch, semi-continuous or continuous manner. The esterification reaction may be conducted in a single reaction zone or in a plurality of reaction zones, in series or in parallel. The reaction may be conducted intermittently or continuously. The reaction may be conducted in a vessel equipped with a thermometer, stirrer and a distillation column to separate water that distills from reactants and optionally a Dean Stark trap. The reactor may be fitted with internal and/or external heat exchangers to control temperature fluctuations. Preferably, an agitation means is available to ensure a uniform reaction. Mixing induced by vibration, shaker, stirrer, rotating, oscillation, etc. are all illustrative of the types of agitation means which are contemplated for use in the esterification reaction. Such agitation means are available and well known to those skilled in the art.

Aside from functioning as a wax, addition of the mixture of alkyl esters of rosin acid to the rubber compositions may act as a processing aid in the rubber compounds. The term "rubber" or "elastomer" as used herein embraces both natural rubber and all its various raw and reclaim forms as well as various synthetic rubbers. Representative synthetic polymers are the homopolymerization products of butadiene and its homologues and derivatives, as for example, methylbutadiene, dimethylbutadiene, chloroprene (neoprene synthetic rubber) and pentadiene as well as copolymers such as those formed from butadiene or its homologues or derivatives with other unsaturated organic compounds. Among the latter are acetylenes, e.g., vinyl acetylene; olefins, for example, isobutylene, which copolymerizes with isoprene to form butyl rubber; vinyl compounds, for example vinylchloride, acrylic acid, acrylonitrile (which polymerizes with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Also included are the various synthetic rubbers prepared by the homopolymerization of isoprene and the copolymerization of isoprene with other diolefins and various unsaturated organic compounds. Additionally, included are the synthetic rubbers such as 1,4-cis polybutadiene and 1,4-cis polyisoprene and similar synthetic rubbers such as EPDM. The preferred rubbers for use with the present invention are natural rubber, polybutadiene, SBR and polyisoprene.

The rubber compositions containing the mixture of alkyl esters of rosin acid find utility in, for example, tires, motor mounts, rubber bushings, power belts, printing rolls, rubber shoe heels and soles, rubber floor tiles, caster wheels, elastomer seals and gaskets, conveyor belt covers, wringers, hard rubber battery cases, automobile floor mats, mud flaps for trucks, ball mill liners, and the like. Preferably, the rubber compositions containing the mixture of alkyl esters of rosin acid are used in tire applications including for use in treads, sidewalls, apex and chafers.

The mixture of alkyl esters of rosin acid may be used in a wide variety of proportions in the rubber and may be a substitute, in whole or part for conventional waxes. Generally, the level of alkyl ($C_6$–$C_{18}$) esters of rosin acid that may be added to the rubber may range from about 0.1 phr (parts per hundred rubber) to about 10 phr. Preferably the amount of alkyl ($C_6$–$C_{18}$) esters of rosin acid that is added ranges from about 0.5 phr to about 5 phr.

In addition to the mixture of alkyl ($C_6$–$C_{18}$) esters of rosin acid, other rubber additives may also be incorporated in the rubber. The additives commonly used in rubber vulcanizates are, for example, carbon black, tackifier resins, processing aids, antidegradants, fatty acids, activators, waxes, oils and peptizing agents.

By class, representative of the conventional antioxidants and antiozonants (commonly classified together as antidegradants) which may be used include monophenols, bisphenols and thiobisphenols, polyphenols, hydroquinone derivatives, phosphates, thioesters, naphthylamines, diphenylamines and other diarylamine derivatives, para-phenylenediamines and quinolines.

As known to those skilled in the art, depending on the intended use of the sulfur vulcanizable material, certain additives mentioned above are commonly used in conventional amounts. Typical additions of carbon black comprise about 20 to 100 parts by weight of diene rubber (phr), which for many tire applications is generally from about 40 to 70 phr. Typical amounts of tackifier resins comprise about 2 to 10 phr. Typical amounts of processing aids comprise about 1 to 8 phr. Typical amounts of antioxidants comprise 1 to about 5 phr. Typical amounts of antiozonants comprise 1 to about 5 phr. Typical amounts of fatty acids such as stearic acid, oleic acid and the like comprise from about 1 to about 2 phr. Typical amounts of zinc oxide comprise 3 to 5 phr. Typical amounts of waxes comprise 1 to 5 phr. Typical amounts of processing oils comprise 5 to 50 phr. Typical amounts of peptizers comprise 0.1 to 1 phr.

The vulcanization of the rubber containing the mixture of alkyl ($C_6$–$C_{18}$) ester of rosin acid is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to 8 phr with a range of from 1.5 to 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to 2.0 phr. In another embodiment, combinations of two or more accelerators may be used which may consist of a primary accelerator which is generally used in the larger amount (0.5 to 2.0 phr), and a secondary accelerator which is generally used in smaller amounts (0.05–0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not effected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a secondary accelerator is used, the secondary accelerator is preferably a guanidine, dithiocarbamate or thiuram compound.

The following examples are presented in order to illustrate but not limit the present invention.

EXAMPLE 1

Preparation of a Mixture of Alkyl Ester of Rosin Acid 150 grams (0.5 mole) of tall oil rosin acid and 25.5 grams (0.25 mole) of hexyl alcohol, 46.5 grams (0.25 mole) of dodecanol alcohol and 67.5 grams (0.25 mole) of octadecyl alcohol were added to 11 grams of toluenesulfonic acid in 130 ml of xylene and charged into a Dean-Stark equipped 1-liter round bottom flask. After 8 hours of reflux at a pot temperature of about 185-190° C., 100% of the theoretical amount of water was (15 ml) collected. The reaction mixture was dried and stripped of solvent. The reaction product weighed 272 grams and had an acid number of 32. Infrared analysis showed formation of the ester functions.

EXAMPLE 2

Four rubber stocks were prepared in a two stage process which consisted of the preparation of a non-productive stage (Banbury Stage 1) followed by the preparation of a productive stage (Banbury Stage 2).

The recipe for each of the formulations can be found in Table I below. In addition to the recipes of Table I, each formulation contained conventional amounts of processing oil, fatty acids, zinc oxide, sulfur and accelerator. The processing oil and fatty acids were added in the non-productive stage. The zinc oxide, sulfur and accelerator were added in the productive stage. The formulations are characteristic of that used in a sidewall application. Table I also lists the physical data for each of the four formulations.

TABLE I

| | Sample 1 | Sample 2 | Sample 3 | Sample 4 | Banbury Stage |
|---|---|---|---|---|---|
| Natural Rubber | 50 | 50 | 50 | 50 | 1 |
| cis-PBD | 50 | 50 | 50 | 50 | 1 |
| Carbon Black | 45 | 45 | 45 | 45 | 1 |
| Microcrystalline Wax | 1.00 | — | 1.00 | 2.00 | 1 |
| Paraffinic Wax | 0.50 | — | 0.50 | 1.00 | 1 |
| Mixed Rosin Esters[1] | — | 1.50 | 1.50 | — | 1 |
| Antiozonant | 3.00 | 3.00 | 3.00 | 3.00 | 1 |
| Antioxidant | 1.00 | 1.00 | 1.00 | 1.00 | 1 |
| Antioxidant | 1.00 | 1.00 | 1.00 | 1.00 | 2 |
| *Rheometer 150° C.* | | | | | |
| Max torque | 38.2 | 38.3 | 37.0 | 37.5 | |
| Min torque | 10.4 | 10.1 | 9.9 | 9.9 | |
| torque | 27.8 | 28.2 | 27.1 | 27.6 | |
| $t_{90}$, minutes | 15.2 | 15.2 | 15.7 | 15.6 | |
| $t_{25}$, minutes | 9.2 | 9.3 | 9.5 | 9.4 | |
| *Stress Strain* | | | | | |
| Tensile Strength (MPa) | 17.2 | 17.3 | 16.8 | 16.6 | |
| Elongation at Break (%) | 532 | 537 | 548 | 523 | |
| 300% Modulus (MPa) | 8.2 | 8.0 | 7.5 | 7.9 | |
| *Rebound (ASTM D1054)* | | | | | |
| 100° C. (%) | 69.8 | 69.9 | 68.7 | 69.9 | |
| *Peel Adhesion* | | | | | |
| 95° C. (N) | 108.5 | 101.0 | 109.0 | 91.0 | |

[1] Prepared in Example 1

Weathering Test

The objective of this test is to continuously expose a wedge shaped rubber specimen to normal weather conditions under dynamic oscillation. The rubber samples are subjected to a dynamic strain amplitude of approximately 15% of the overall sample length. The flexing rate is about 1 Hz. Each sample is prepared from a 10.2×15.2×0.2 cm cured sheet of the test compound. Because of the specimen taper, the actual strain (elongation) for any one area will vary with the width at that point. This tapering causes a stress concentration at the narrow neck of the sample, thus initiating cracking in this location. At various time intervals, the samples are inspected to evaluate the average crack length (measured in millimeters) and density. Density is based upon the percent of surface area of the sample that is cracked. The samples are run until failure.

Table II below lists the weathering results for Samples 1–4.

TABLE II

| Days of Exposure | | Sample 1 | Sample 2 | Sample 3 | Sample 4 |
|---|---|---|---|---|---|
| 36 | Crack length | 0 | 0 | 0 | 0 |
| | Density % | 0 | 0 | 0 | 0 |
| 71 | Crack length | 0.5 | 0 | 0 | 0 |
| | Density % | Edge only | 0 | 0 | 0 |
| 107 | Crack length | Broke | 1 | 3 | 2 |
| | Density % | 100 | Edge only | 50 | 50 |
| 130 | Crack length | — | 1 | 4 | Broke |
| | Density % | — | 50 | 100 | 100 |
| 139 | Crack length | — | 5 | Broke | — |
| | Density % | — | 50 | 100 | — |
| 144 | Crack length | — | 5 | — | — |
| | Density % | — | 55 | — | — |
| 158 | Crack length | — | 7 | — | — |
| | Density % | — | 95 | — | — |
| 172 | Crack length | — | Broke | — | — |
| | Density % | — | 100 | — | — |

As can be seen from the above data, the cured properties of the rubber samples containing a mixture of alkyl esters of rosin acid are equivalent and in many cases superior to the control. The superiority is readily apparent in terms of the weathering test.

What is claimed is:

1. A process for preparing rubber compositions which comprises admixing a rubber selected from the group consisting of natural rubber, homopolymers of conjugated diolefins, copolymers of conjugated diolefins and ethylenically unsaturated monomers or mixtures thereof with a mixture of alkyl esters of rosin acid wherein said mixture of alkyl esters of rosin acid comprise at least
   (a) from about 10 to about 50 percent by weight of a $C_6$ ester of rosin acid;
   (b) from about 10 to about 50 percent by weight of a $C_{12}$ ester of rosin acid; and
   (c) from about 10 to about 50 percent by weight of a $C_{18}$ ester of rosin acid.

2. The process of claim 1 wherein the alkyl ester of rosin acid is at a concentration of from about 0.1 parts per hundred rubber to 10 parts per hundred rubber and is in an intimate mixture with said rubber.

3. The process of claim 2 wherein said alkyl ester of rosin acid is added to a rubber selected from the group consisting of natural rubber, homopolymers of conjugated diolefins and copolymers of conjugated diolefins and ethylenically unsaturated monomers.

4. The process of claim 2 wherein said alkyl ester of rosin acid is at a concentration of from about 0.5 parts per hundred rubber to 5 parts per hundred rubber.

5. The process of claim 1 wherein said mixture of alkyl esters of rosin acid comprise at least:
   (a) from about 30 to 35 percent by weight of a $C_6$ ester of rosin acid;
   (b) from about 30 to 35 percent by weight of a $C_{12}$ ester of rosin acid; and
   (c) from about 30 to 35 percent by weight of a $C_{18}$ ester of rosin acid.

6. A rubber composition which comprises (1) a rubber selected from the group consisting of natural rubber, homopolymers of conjugated diolefins and copolymers of conjugated diolefins, ethylenically unsaturated monomers or mixtures thereof and (2) a mixture of alkyl esters of rosin acid wherein said mixture of alkyl esters of rosin acid comprises at least
   (a) from about 10 to about 50 percent by weight of a $C_6$ ester of rosin acid;
   (b) from about 10 to about 50 percent by weight of a $C_{12}$ ester of rosin acid; and
   (c) from about 10 to about 50 percent by weight of a $C_{18}$ ester of rosin acid.

7. The rubber composition of claim 6 wherein the rubber is selected from the group consisting of natural rubber, polybutadiene, SBR, polyisoprene or mixtures thereof.

8. The rubber composition of claim 7 wherein said alkyl mixtures of esters of rosin acid is at a concentration of from about 0.1 parts per hundred rubber to 10 parts per hundred rubber.

9. The rubber composition of claim 8 wherein said alkyl ester of rosin acid is at a concentration of from about 0.5 parts per hundred rubber to 5 parts per hundred rubber.

10. The rubber composition of claim 6 wherein said mixture of alkyl esters of rosin acid comprise at least:

(a) from about 30 to 35 percent by weight of a $C_6$ ester of rosin acid;
(b) from about 30 to 35 percent by weight of a $C_{12}$ ester of rosin acid; and
(c) from about 30 to 35 percent by weight of a $C_{18}$ ester of rosin acid.

* * * * *